Oct. 12, 1926.  
J. J. THACHER  
AUTOMATIC LATHE  
Filed April 20, 1923

INVENTOR  
John J. Thacher  
BY  
ATTORNEY

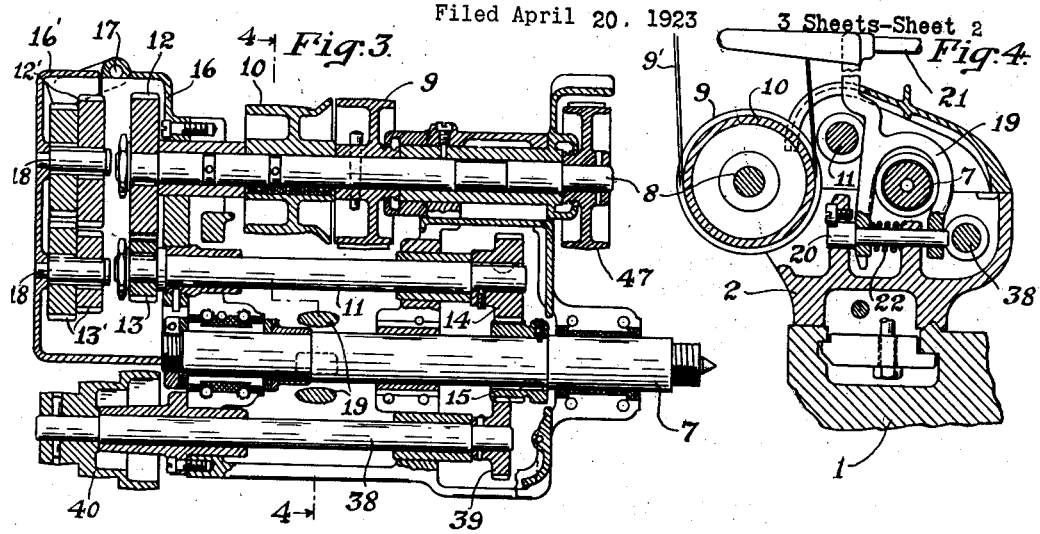

Oct. 12, 1926.  
J. J. THACHER  
AUTOMATIC LATHE  
Filed April 20, 1923  
1,602,724  
3 Sheets-Sheet 3
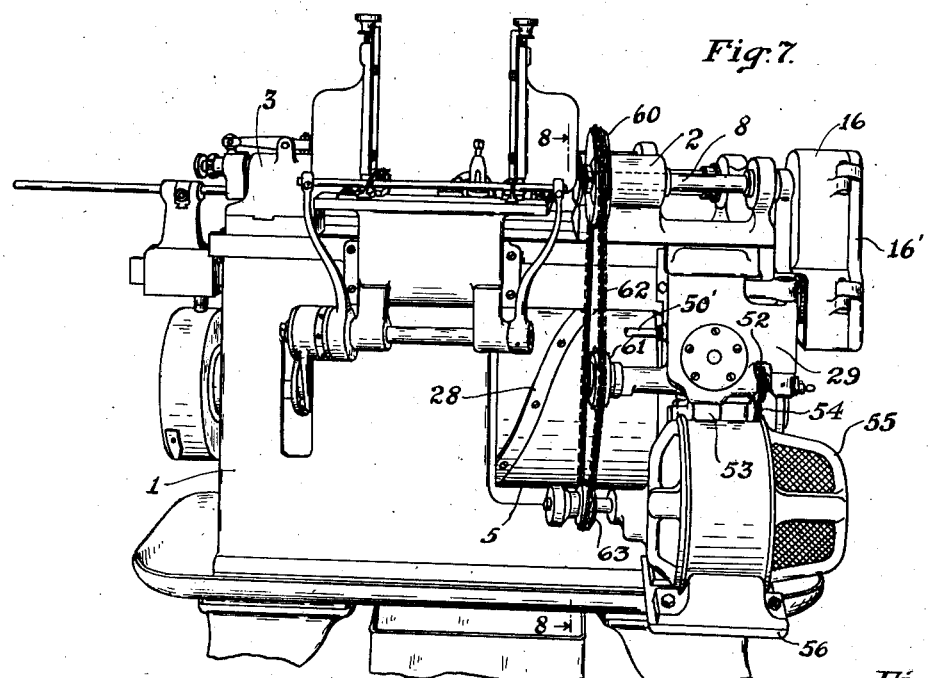
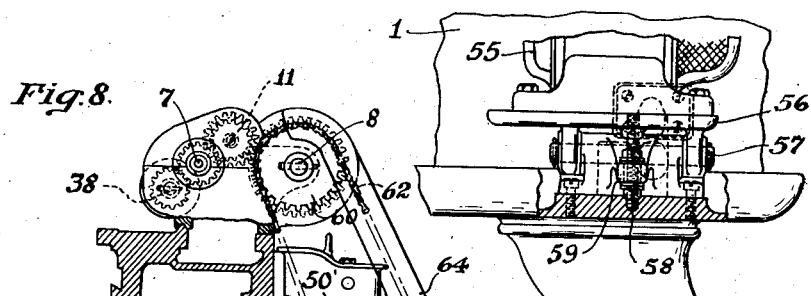
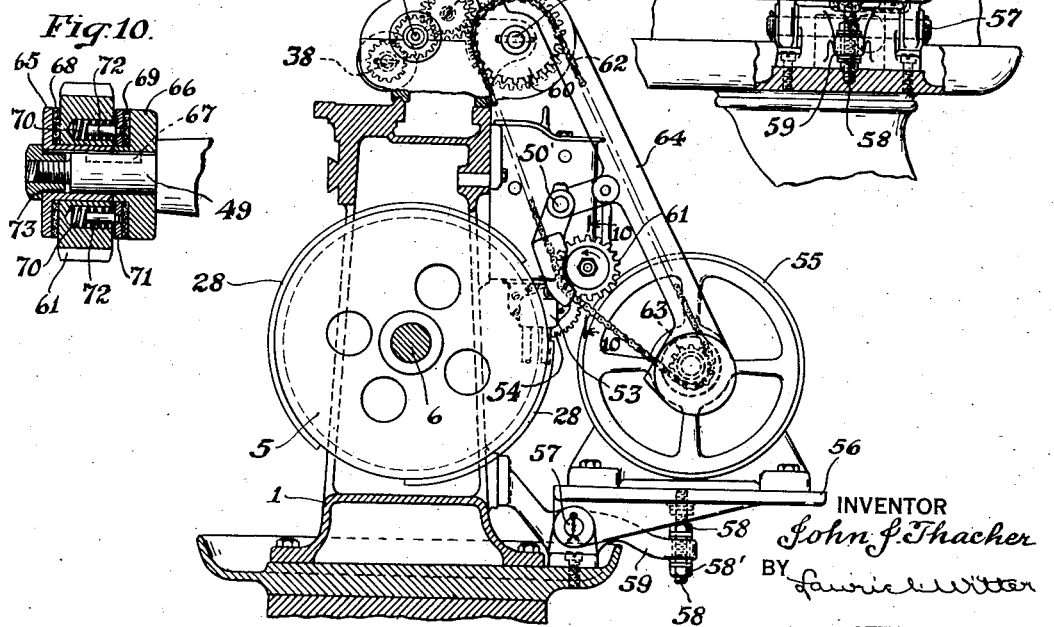
INVENTOR  
John J. Thacher  
BY  
ATTORNEY Patented Oct. 12, 1926.

1,602,724

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

AUTOMATIC LATHE.

Application filed April 20, 1923. Serial No. 633,533.

This invention relates to improvements in automatic machines and in particular to improvements in an automatic lathe of the type shown in my Patent No. 1,507,265, dated September 2, 1924. My present invention more particularly relates to improved means for driving the lathe spindle and operating the tool carriage.

The improved mechanism comprises a lathe spindle and a parallel driving shaft therefor mounted in the lathe headstock. An operative driving connection including simple and inexpensive change gears is provided between the spindle and drive shaft, a housing or cover for the change gears being pivoted to the headstock and having means therein for supporting and housing substitute change gears. One object of my invention is to provide an improved spindle driving mechanism of this type.

A further and primary object of my invention is to provide improved optional driving mechanism for the lathe spindle, such mechanism comprising means for operating the spindle driving shaft either from an overhead countershaft or from a motor mounted on the base of the machine. The mechanism is so arranged that either of these drivers may be used without in any way affecting the construction or operation of the headstock and its mechanism.

Another feature of my invention relates to the tool carriage operating mechanism which is so arranged that the same may be driven slowly from the spindle for feeding and relatively rapid from either of the said driving mechanisms for traversing. The speed of tool feed is therefore always dependent upon the spindle speed and the tool may be rapidly traversed directly from the main driver. It is accordingly a further object of the invention to provide improved mechanism for performing these functions.

With the above and other objects in view, my invention consists in the features of construction and operation set forth in the following specification and illustrated in the accompanying drawings. In such drawings annexed hereto and forming a part of this specification, I have shown certain embodiments of my invention but it will be understood that the invention can be otherwise embodied and that the drawings are not to be construed as defining or limiting the scope of the invention, the claims appended to this specification being relied upon for that purpose.

Referring to the figures of the drawings:—

Fig. 3 is a distorted plan sectional view through the headstock.

Fig. 4 is a cross section thereof on line 4—4 of Fig. 3.

Fig. 5 is a fragmentary rear elevation of the headstock end of the machine, certain parts being shown in section and broken away.

Fig. 6 is a fragmentary cross section thereof on line 6—6 of Fig. 5.

Fig. 7 is a view like Fig. 2 but showing the machine as motor operated.

Fig. 8 is a fragmentary view taken on line 8—8 of Fig. 7.

Fig. 9 is a fragmentary view showing the adjustable mounting of the motor.

Fig. 10 is a detail sectional view taken on line 10—10 of Fig. 8.

Figure 1:
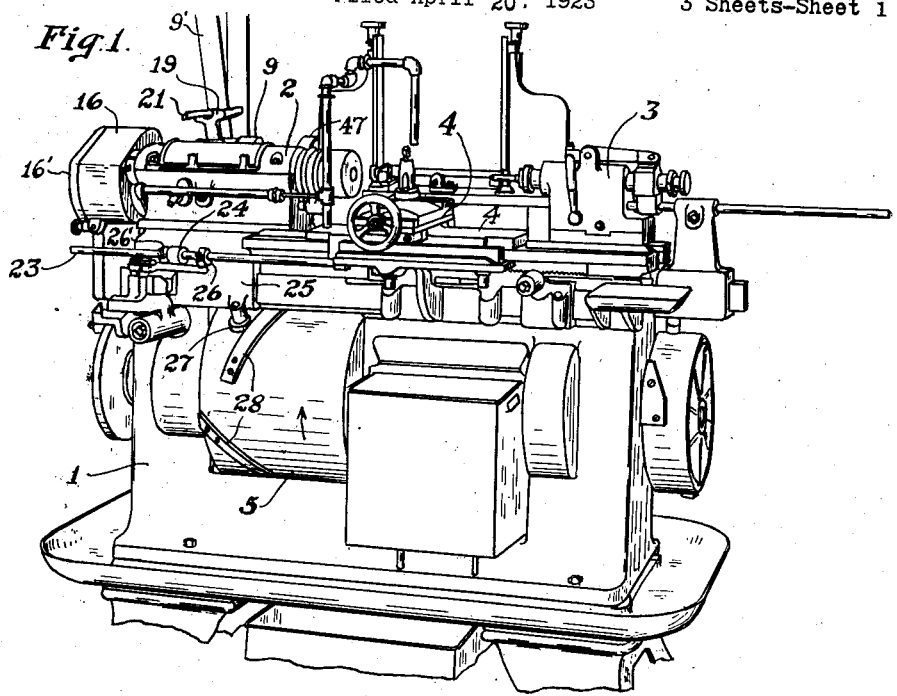
Figure 1 is a front perspective view of my improved automatic lathe equipped with means for driving the same from an overhead countershaft.
Figure 2:
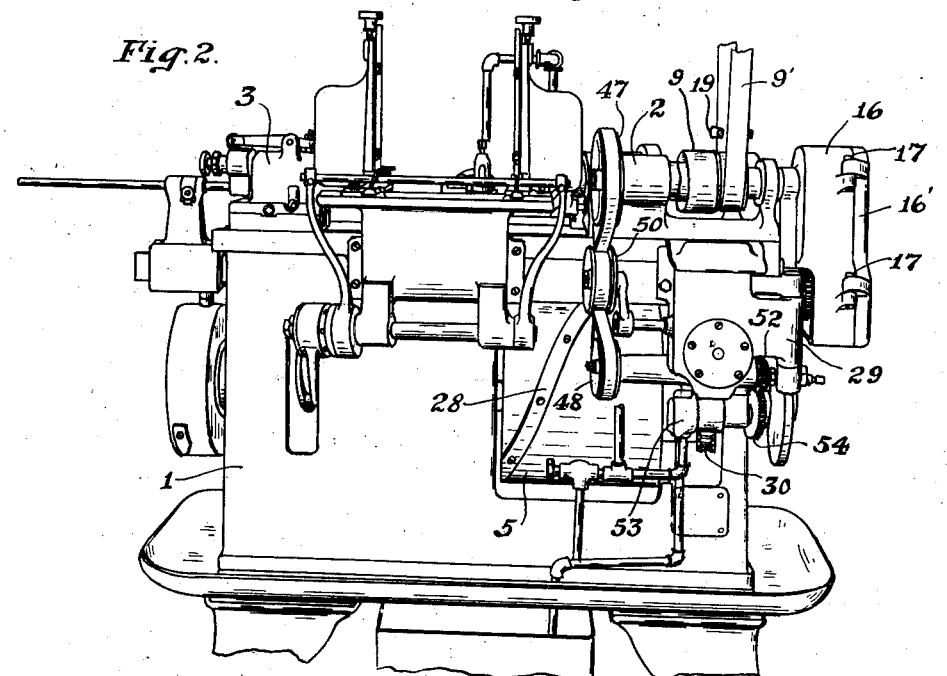
Fig. 2 is a rear perspective view thereof.

As above stated, this invention relates primarily to improvements in automatic lathes. The purpose of the improvements is particularly to so standardize such a lathe that the same may be substantially manufactured and then fitted to be driven either from an overhead countershaft or from a motor mounted on the base of the lathe. As shown in the drawings, the lathe spindle is driven through simple change speed mechanism from an adjacent driving shaft parallel thereto in the headstock. This driving shaft may be belt driven from a pulley mounted thereon as shown in Figs. 1 to 5 or motor driven from a sprocket wheel mounted thereon as shown in Figs. 7 and 8. The tool carriage is fed from the lathe spindle and is adapted to be traversed rapidly directly from the main driver whether the same be belt driven or motor driven. The novel construction whereby these various operating functions may be accomplished comprises the improvements of my present invention and such construction will now be described in detail.

Referring first to the mechanism shown in Figs. 1 to 6 of the drawings, 1 indicates the base or bed of my automatic lathe having a headstock 2 and a tailstock 3 thereon, A tool carriage 4 is mounted for sliding movement on the base longitudinally of and between the headstock and tailstock. The tool carriage is adapted to be operated from a cam drum 5 mounted on a shaft 6 extending longitudinally through the base or bed of the machine. A tool slide 4' is mounted on the carriage for movement transversely of the headstock and tailstock.

A work spindle 7 is rotatably mounted in the headstock and is adapted to be driven from a parallel driving shaft 8 also in the headstock. As illustrated in Figs. 1, 2, 3 and 5, the shaft 8 is provided respectively with fast and loose pulleys 9 and 10 thereon whereby the same may be driven by a belt 9' from an overhead countershaft. The driving connection between the shaft 8 and spindle 7 comprises an intermediate shaft 11, change gears 12 and 13 and gears 14 and 15. The speed of the spindle may be varied by transposing the gears 12 and 13 and by substituting other sized gears therefor.

The change gears 12 and 13 are enclosed by a housing 16 having a cover section 16' pivoted thereon at 17. Pins 18 are provided within the section 16' and are adapted to support substitute change gears 12' and 13'. The pivots 17 of the housing instead of being arranged in a vertical line are slightly inclined toward the spindle whereby the section 16' normally remains in the closed position due to gravity.

A belt shifter 19 straddles the spindle 7 and is pivoted on a bolt 20 in the headstock. The free end of the shifter is provided with an operating handle 21 and a spring 22 is adapted to hold the shifter in contact with the headstock to prevent looseness and rattling thereof.

A rod 23 is secured to the tool carriage 4 and extends longitudinally of the machine. This rod extends through a lug 24 on a plate 25 slidably mounted on the lathe bed. A pair of collars 26 and 26' are adjustably secured to the rod at opposite sides of the lug 24. The plate 25 is provided with a roller 27 adapted to cooperate with cam strips 28 on the cam drum 5 whereby to reciprocate the plate 25 and the tool carriage when the drum is rotated in the direction of the arrow (Fig. 1).

Secured to the rear of the machine beneath the headstock is a gear box 29 within which is housed mechanism for controlling the rotation of the shaft 6 and cam drum 5. A worm wheel 30 on shaft 6 is engaged by a worm 31 on a transverse shaft 32. One end of this shaft is squared to receive a handle 33 for manually rotating the same. The other end of the shaft extends into the box 29 and is provided with a clutch 34 splined thereon. This clutch may be shifted longitudinally into clutching engagement with either a slowly revolving carriage feeding worm wheel 35 or a rapidly revolving carriage traversing spiral gear 36. Mechanism for shifting this clutch, including a clutch shifting rod 37, is more fully described in my aforesaid patent.

The carriage feeding worm wheel 35 is driven from the lathe spindle 7 as follows: A shaft 38 is mounted in the headstock parallel with the spindle and is operatively connected thereto through gears 39 and 15. A cone pulley 40 on the opposite end of this shaft is in driving alignment with a cone pulley 41 rotatably supported on the box 29. A gear 42 secured to the pulley 41 meshes with a gear 43 on a shaft 44 extending into the box and having a worm 45 thereon in mesh with the worm wheel 35. The worm wheel 35 is thereby driven from the spindle 7 and the speed thereof may be varied by means of the cone pulleys 40 and 41.

The carriage traversing spiral gear 36 is driven from the main driving shaft 8 as follows: A belt 46 operatively connects a pulley 47 on the inner end of the shaft 8 with a pulley 48 on one end of a shaft 49 extending into the box 29. A belt tightening pulley 50 is provided for the belt 46. A spiral gear 51 on the shaft 49 within the box 29 meshes with the spiral gear 36. The spiral gear 36 is thereby driven at a relatively rapid speed directly from the main driving shaft 8. It will be understood that the belt tightening pulley 50 may be so adjusted that a slipping of the belt 46 would occur to prevent shock or breakage of the machine should movement of the tool carriage or its operating parts become obstructed. A spur gear 52 on the other end of shaft 49 meshes with a gear 54 to drive a lubricating pump 53 mounted on the bottom of box 29.

From the above description it will be noted that the headstock mechanism is very simple and compactly arranged and that the spindle may be driven at any of various speeds from the main driving shaft 8. Furthermore, the tool carriage may be operated slowly from the spindle for feeding merely by engaging the clutch 34 with the worm wheel 35 and may be operated rapidly from the main driving shaft 8 for traversing merely by engaging the clutch with the spiral gear 36.

The mechanism shown in Figs. 7, 8 and 9 is the same as that just described except that the machine is motor driven instead of belt driven. A motor 55 is mounted on a bracket 56 pivoted at 57 to the base 1. A bolt 58 anchored to a rigid bracket 59 threadedly engages the bracket 56 whereby to adjustably support the motor.

It will be noted that the before-mentioned pulleys 9 and 10 are not provided on the shaft 8 and that a sprocket gear 60 has been substituted for the pulley 47. A sprocket gear 61 has also been substituted for the pulley 48 shown in Fig. 2. A driving chain 62 operatively connects a sprocket pinion 63 on the motor shaft with the sprocket gears 60 and 61. The motor thereby serves to directly operate both the main driving shaft 8 and the rapid traversing gear 36. The tension of the chain 62 may be adjusted by adjusting the nuts 58' of the bolt 58. As shown in Fig. 8, a chain guard 64 covering the chain 62 is supported on the belt tightener pulley bracket 50'. This guard is not illustrated in Fig. 7.

As illustrated in detail in Fig. 10, the sprocket gear 61 is frictionally mounted on the shaft 49. A pair of flanged sprocket supporting and engaging elements 65 and 66 are secured to the shaft 49 by means of a key 67. A pair of friction washers 68 and 69 are mounted on the said elements respectively between their flanges and the sprocket. The sprocket is provided with a plurality of bores therein within which are seated compression springs 70. A plate 71 adjacent the washer 69 is provided with a plurality of pins 72 extending respectively into the springs 70. The springs normally expand to provide a frictional connection between the sprocket and the flanges of the elements 65 and 66 and such frictional connection can be adjusted by means of a nut 73 threaded to the outer end of the shaft 49. It will be understood that this construction provides a frictional connection between the sprocket gear 61 and the spiral gear 36 to prevent shock or breakage of the machine should movement of the tool carriage or its operating parts become obstructed.

It is believed that the various improvements comprising my invention will be clearly understood from the above description and further description thereof is therefore believed to be unnecessary herein. The parts of the machine illustrated in the drawings but not comprising within themselves a part of my present invention have not been described herein. Reference to my aforementioned patent may be had for a description of such parts.

What I claim is:—

1. In a lathe, the combination of a base, a headstock and a tailstock thereon, a spindle mounted in the headstock, a tool carriage movable on the base longitudinally of the spindle between the headstock and tailstock, a tool slide movable on the carriage transversely of the spindle, a shaft parallel with the spindle, means for driving the shaft, means including change gears operatively connecting the shaft with the spindle, a plurality of such gears being removable and interchangeable, a driving connection operated by the said driving means for moving the carriage slowly for feeding, and a driving connection for moving the carriage relatively rapid for traversing.

2. In a lathe, the combination of a base, a headstock and a tailstock thereon, a spindle mounted in the headstock, a tool carriage movable on the base longitudinally of the spindle between the headstock and tailstock, a tool slide movable on the carriage transversely of the spindle, means operated from the spindle for moving the carriage for feeding, a shaft parallel with the spindle, means for driving the shaft, means including change gears operatively connecting the shaft with the spindle, a plurality of such gears being removable and interchangeable, and means for moving the carriage relatively rapid for traversing.

3. In a lathe, the combination of a base, a headstock and a tailstock thereon, a spindle mounted in the headstock, a tool carriage movable on the base longitudinally of the spindle between the headstock and tailstock, a tool slide movable on the carriage transversely of the spindle, a rotary cam beneath the headstock, means providing a driving connection from the cam to the carriage, means for rotating the cam from the spindle for feeding the carriage, a shaft parallel with the spindle, means for driving the shaft, means including change gears operatively connecting the shaft with the spindle, a plurality of such gears being removable and interchangeable, and means for rotating the cam relatively rapid for traversing the carriage.

4. In a lathe, the combination of a base, a headstock and a tailstock thereon, a spindle in the headstock, a motor mounted on the base and operatively connected to the spindle for driving the same, a carriage movable on the base longitudinally of the spindle between the headstock and tailstock, a tool slide movable on the carriage transversely of the spindle, means driven from the spindle for moving the carriage for feeding, and means adjacent to and driven from the motor for moving the carriage relatively rapid for traversing.

5. In a lathe, the combination of a base, a headstock and a tailstock thereon, a spindle mounted in the headstock, a motor mounted on the base, an operative connection from the motor to the spindle, a carriage movable on the base longitudinally of the spindle between the headstock and tailstock, a tool slide movable on the carriage transversely of the spindle, means driven from the spindle for moving the carriage for feeding, and means driven from the said operative connection for moving the carriage relatively rapid for traversing.

6. In a lathe, the combination of a base, a headstock thereon, a spindle in the headstock, a motor mounted on the base and operatively connected to the spindle for driving the same, a tool support movable on the base longitudinally of the spindle, a feed box adjacent the motor, means including gearing within the box for moving the tool support, means for operating the gearing from the spindle for slowly moving the tool support for feeding, and means for operating the gearing from the motor for moving the tool support relatively rapid for traversing.

7. In a lathe, the combination of a base, a headstock thereon, a spindle mounted in the headstock, a motor mounted on the base, an operative connection from the motor to the spindle, a tool support movable on the base longitudinally of the spindle, means driven from the spindle for moving the tool support for feeding, means driven from the said operative connection for moving the tool support relatively rapid for traversing, and means rendering the last named means non-positive in operation whereby to prevent shock or breakage thereof.

8. In a lathe, the combination of a base, a headstock thereon, a spindle in the headstock, a motor on the base, means including a sprocket chain connecting the motor with the spindle, a tool support movable on the base longitudinally of the spindle, a feed box, means including gearing within the box for moving the tool support, means for operating the gearing from the spindle for slowly moving the tool support for feeding, and means including a frictional connection for operating the gearing from the sprocket chain for moving the tool support relatively rapid for traversing.

In testimony whereof, I hereto affix my signature.

JOHN J. THACHER.